(12) United States Patent
Meijering et al.

(10) Patent No.: US 11,698,528 B2
(45) Date of Patent: Jul. 11, 2023

(54) MULTI-DEPTH DISPLAY SYSTEM

(71) Applicants: JAGUAR LAND ROVER LIMITED, Coventry (GB); CAMBRIDGE ENTERPRISE LIMITED, Cambridge (GB)

(72) Inventors: Valerian Meijering, Coventry (GB); Robert Hardy, Coventry (GB); Ali Yöntem, Cambridge (GB); Kun Li, Cambridge (GB); Daping Chu, Cambridge (GB)

(73) Assignees: JAGUAR LAND ROVER LIMITED, Coventry (GB); CAMBRIDGE ENTERPRISE LIMITED, Cambridge (GB)

( * ) Notice: Subject to any disclaimer, the term of this patent is extended or adjusted under 35 U.S.C. 154(b) by 734 days.

(21) Appl. No.: 16/465,067

(22) PCT Filed: Nov. 29, 2017

(86) PCT No.: PCT/EP2017/080870
§ 371 (c)(1),
(2) Date: May 29, 2019

(87) PCT Pub. No.: WO2018/100000
PCT Pub. Date: Jun. 7, 2018

(65) Prior Publication Data
US 2019/0384059 A1     Dec. 19, 2019

(30) Foreign Application Priority Data
Nov. 30, 2016   (GB) ...................................... 1620338

(51) Int. Cl.
*G02B 27/01* (2006.01)
*G02B 26/08* (2006.01)
(Continued)

(52) U.S. Cl.
CPC ..... *G02B 27/0101* (2013.01); *G02B 26/0833* (2013.01); *G02B 30/52* (2020.01);
(Continued)

(58) Field of Classification Search
None
See application file for complete search history.

(56) References Cited

U.S. PATENT DOCUMENTS

| | | |
|---|---|---|
| 2001/0013960 A1 | 8/2001 | Popovich et al. |
| 2004/0085643 A1 | 5/2004 | Ishikawa et al. |

(Continued)

FOREIGN PATENT DOCUMENTS

| | | |
|---|---|---|
| EP | 2 865 555 A1 | 4/2015 |
| EP | 2 960 095 A1 | 12/2015 |

(Continued)

OTHER PUBLICATIONS

Patents Act 1977: Combined Search and Examination Report under Sections 17 and 18(3), UKIPO Application No. GB1620338.2, dated May 30, 2017, 6 pp.

(Continued)

*Primary Examiner* — Toan Ton
*Assistant Examiner* — Danell L Owens
(74) *Attorney, Agent, or Firm* — McCoy Russell LLP

(57) ABSTRACT

An imaging system includes an image realisation device, and projection optics for rendering a display image on a display screen. The image realisation device includes an image realisation surface and a light structuring device having a surface with a first and second region. The light structuring device simulates a first lens on the first region of the surface. A first source image formed on a first region of the image realisation surface and projected through the projection optics renders a first display image on the display screen at a first apparent depth. The light structuring device (Continued)

simulates a second lens on the second region of the surface. A second source image formed on a second region of the image realisation surface and projected through the projection optics renders a second display image on the display screen at a second apparent depth. The first and second lens are independently configurable.

20 Claims, 8 Drawing Sheets

(51) Int. Cl.
    *H04N 5/74* (2006.01)
    *G02B 30/52* (2020.01)
    *H04N 13/395* (2018.01)
    *H04N 13/398* (2018.01)
    *H04N 13/39* (2018.01)

(52) U.S. Cl.
    CPC ......... *H04N 5/7408* (2013.01); *H04N 13/395* (2018.05); *H04N 13/398* (2018.05); *G02B 2027/0127* (2013.01)

(56) References Cited

U.S. PATENT DOCUMENTS

| | | |
|---|---|---|
| 2005/0179868 A1 | 8/2005 | Seo et al. |
| 2008/0018641 A1 | 1/2008 | Sprague et al. |
| 2008/0265150 A1 | 10/2008 | Holmes |
| 2010/0085276 A1* | 4/2010 | Cable .................. G03H 1/2249 345/6 |
| 2013/0242404 A1 | 9/2013 | Kobayashi |
| 2013/0285885 A1* | 10/2013 | Nowatzyk .......... G02B 27/0172 345/8 |
| 2014/0036374 A1 | 2/2014 | Lescure et al. |
| 2015/0061976 A1 | 3/2015 | Ferri |
| 2016/0124295 A1 | 5/2016 | Montgomery |
| 2016/0187666 A1 | 6/2016 | Manns et al. |
| 2016/0209647 A1 | 7/2016 | Fürsich |
| 2016/0260258 A1 | 9/2016 | Lo et al. |
| 2016/0277725 A1 | 9/2016 | Ellsworth et al. |
| 2017/0261746 A1* | 9/2017 | Tam ...................... G06T 19/006 |

FOREIGN PATENT DOCUMENTS

| | | |
|---|---|---|
| WO | WO 2006/061959 A1 | 6/2006 |
| WO | WO 2015/019567 A1 | 2/2015 |
| WO | WO 2015/134738 A1 | 9/2015 |
| WO | WO 2015/173556 A1 | 11/2015 |
| WO | WO 2015/184409 A1 | 12/2015 |
| WO | WO 2016/027706 A1 | 2/2016 |
| WO | WO 2016/052186 A1 | 4/2016 |
| WO | WO 2016/105521 A1 | 6/2016 |

OTHER PUBLICATIONS

International Search Report and Written Opinion of the International Searching Authority, International Application No. PCT/EP2017/080870, dated May 28, 2018, 22 pp.
Patents Act 1977: Combined Search and Examination Report under Sections 17 and 18(3), UKIPO Application No. GB1620340.8, dated May 30, 2017, 6 pp.
International Search Report and Written Opinion of the International Searching Authority, International Application No. PCT/EP2017/080873, dated Apr. 5, 2018, 16 pp.
Patents Act 1977: Combined Search and Examination Report under Sections 17 and 18(3), UKIPO Application No. GB1620341.6, dated May 12, 2017, 5 pp.
International Search Report and Written Opinion of the International Searching Authority, International Application No. PCT/EP2017/080933, dated Mar. 13, 2018, 16 pp.
Patents Act 1977: Combined Search and Examination Report under Sections 17 and 18(3), UKIPO Application No. GB1620342.4, dated May 15, 2017, 5 pp.
International Search Report and Written Opinion of the International Searching Authority, International Application No. PCT/EP2017/080872, dated Feb. 5, 2018, 14 pp.

* cited by examiner

MULTI-DEPTH DISPLAY SYSTEM

RELATED APPLICATIONS

This application is a 35 U.S.C. § 371 national stage application of PCT Application No. PCT/EP2017/080870, filed on Nov. 29, 2017, which claims priority from Great Britain Patent Application No. 1620338.2, filed on Nov. 30, 2016, the contents of which are incorporated herein by reference in their entireties. The above-referenced PCT International Application was published in the English language as International Publication No. WO 2018/100000 A2 on Jun. 7, 2018.

TECHNICAL FIELD

The present disclosure relates to a 3-D augmented reality display system. Particularly, but not exclusively, the disclosure relates to an apparatus for creating and projecting multi-depth images onto a display, such as a windscreen for use in a vehicle. Aspects of the invention relate to an imaging system and a method for generating multi-depth images on a screen of a head-up display, and a vehicle incorporating said imaging system.

BACKGROUND

Heads-up displays (HUDs) are known displays where images are projected onto a transparent surface, such as a windscreen. Such displays are well known in a number of different environments including in vehicles.

In automotive HUDs information regarding car conditions (speed etc.) or navigation is displayed onto the windscreen. Such displays are typically limited in size and project the image at a fixed depth to the user. Due to the limited size, the HUD may be cluttered with information that is less relevant to the user taking up real estate. Furthermore, as the image is of a fixed depth all information presented to the user is given equally prominence. This further reduces the efficiency of such displays.

A further consideration is that in vehicles there is typically limited physical space in which such systems can be installed. Typically, such systems must be incorporated into existing spaces present in a vehicle, or installed in as small a space as possible to minimise the need to remove and reinstall existing components. Furthermore, in such systems there is a cost associated with the introduction and installation.

It is an aim of the invention to at least partially address some of the problems on the prior art.

SUMMARY OF THE INVENTION

Aspects and embodiments of the invention provide a system and method for providing multi-depth images, and a vehicle incorporating said imaging system as claimed in the appended claims.

According to an aspect of the invention there is provided an imaging system for generating multi-depth virtual images on a display screen, the imaging system comprising: an image realisation device for forming a source image, projection optics for rendering a display image on the display screen, wherein the display image is a virtual image corresponding to the source image, and wherein the image realisation device comprises: an image realisation surface and a light structuring device having a surface with a first and second region, wherein the light structuring device is configured to simulate a first lens having a first focal length on the first region of the surface, wherein the surface and the image realisation surface are arranged such that a first source image formed on a first region of the image realisation surface and projected through the projection optics will render a first display image on the display screen at a first apparent depth, and wherein the light structuring device is further configured to simulate a second lens on the second region of the surface, said second lens having a second focal length, and wherein the surface and image realisation surface are arranged such that a second source image formed on a second region of the image realisation surface and projected through the projection optics will render a second display image on the display screen at a second apparent depth, wherein the first and second lens are independently configurable. The first source image formed on the first region of the image realisation surface is imaged through the first lens on the first region of the surface. The second source image formed on the second region of the image realisation surface is imaged through the second lens on the second region of the surface.

According to a further aspect of the invention there is provide a method for generating multi-depth virtual images on a display screen, the method comprising: forming a source image with an image realisation device, rendering a display image on the display screen, via a projection optics wherein the display image is a virtual image corresponding to the source image, and wherein the image realisation device comprises: an image realisation surface and a light structuring device having a surface with a first and second region, wherein the light structuring device is configured to simulate a first lens having a first focal length on the first region of the surface, wherein the surface and image realisation surface are arranged such that a first source image formed on a first region of the image realisation surface and projected through the projection optics will render a first display image on the display screen at a first apparent depth, and wherein the light structuring device is further configured to simulate a second lens on the second region of the surface, said second lens having a second focal length, and wherein the surface and image realisation surface are arranged such that a second source image formed on a second region of the image realisation surface and projected through the projection optics will render a second display image on the display screen at a second apparent depth, wherein the first and second lens are independently configurable.

An advantage according to an aspect of the invention is that it provides a system, for use in a vehicle, which allows the information to be presented on a transparent screen i.e. the windscreen of the HUD, at different depths. By providing the information at different depths it is possible to decouple different information content by displaying them at their required 3D coordinates. The apparatus of the invention enables the display of image (and parts of the image) at various depths, resulting in the display becoming less cluttered and furthermore allowing for a greater flexibility regarding the display of the information. For example, a first set of information, such as that related to the car condition (speed/gear/etc.) may be displayed at a first, fixed, depth. According to an aspect of the invention, the first or a second set information, for example navigational objects may be displayed a second depth.

Advantageously the apparatus according to an aspect of the invention allows the HUD to display objects at multiple depths. By allowing information to be presented at different depths the driving experience will be enhanced compared to the conventional head down displays or current versions of the HUDs. It further allows for multi-depth images to be displayed at the same time, with dynamically changeable image depth for each of them.

Optionally, the display screen is the screen of a head-up display.

Optionally, one or both of the size and focal length of the first and second lens are independently configurable.

Optionally the image realisation surface comprises a first surface, said first surface being a diffusive surface configured to render an image. Optionally, wherein the image realisation surface further comprises a second diffuser said first and second diffusers at least partially overlapping. Optionally, wherein at least part of each diffuser is configured to selectively switch between a switchable between a first transparent state and a second optically diffusive state. Optionally, wherein the part of each diffuser that is configured to selectively switch between a switchable between a first transparent state and a second optically diffusive state is controlled by a driver configured to selectively switch between the two states.

By having multiple diffusive surfaces, the focal path may be varied and therefore providing a greater degree of control for displaying images at different depths on the HUD.

Optionally, the image realisation surface is an electroluminescent device, such as an OLED device. Optionally, the system comprises a second electroluminescent device. Optionally wherein at least part of each electroluminescent device is actively switchable between a transparent and image generating state.

The use of the electroluminescent device reduces the space requirement and further provides means for varying the focal length and therefore providing a greater degree of control for the displayed depth of the image.

Optionally the system comprises a picture generation unit for generating the source image to be rendered as the display image on the display screen and projecting the source image onto the image realisation surface.

Optionally, the image realisation device for forming the source image, and picture generation unit are arranged along the optical axis of the picture generating unit.

Optionally, the picture generation unit comprises a laser and a 2D scanning mirror for rendering the images on the diffuser.

Optionally, the picture generation unit comprises a holographic unit to produce computer generated holograms for forming on the diffuser.

Optionally, the picture generation unit comprises a light field unit to produce 3-dimentional light field images for forming on the diffuser.

Optionally, the picture generation unit is a LCD projector or LCoS projector or DMD projector.

According to a further aspect of the invention, there is provided a vehicle comprising an imaging system as described in the preceding aspects.

According to a further aspect of the invention there is provided an imaging system for generating multi-depth virtual images on a screen of a head-up display, the imaging system comprising: an image realisation device for realising a first image, projection optics for rendering a second image on the screen, wherein the second image is a virtual image corresponding to the first image, and wherein the image realisation device comprises: a light structuring device having a surface, wherein the light structuring device is configured to simulate a lens having a first focal length on the surface, wherein the surfaces and image realisation surface are arranged such that a first image realised on one region of the image realisation surface and projected through the projection optics will render the second image on the screen at a first apparent depth.

According to a further aspect of the invention there is provided an imaging system for generating multi-depth virtual images on a display screen, the imaging system comprising: an image realisation device for realising a first image, projection optics for rendering a second image on the screen, wherein the second image is a virtual image corresponding to the first image, and wherein the image realisation device comprises: a light structuring device having a surface, wherein the light structuring device is configured to simulate a lens having a first focal length on the surface, wherein the surfaces and image realisation surface are arranged such that a first image realised on one region of the image realisation surface and projected through the projection optics will render the second image on the screen at a first apparent depth.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In an aspect of the invention the apparatus and the display are installed in a vehicle, such as a motor vehicle 1. Whilst the following description is described with reference to a HUD of a motor vehicle, the disclosure, and concepts described herein are applicable to other forms of HUD (for example those installed on other forms of vehicles or wearable platforms such as helmets or goggles), as well as displays in general, not just HUDs.

In particular, where the invention is installed for use in a confined environment such as a vehicle which can be operated on land (on/off road or track), under or over sea, in air or space. The examples can be, but not limited to, cars, buses, lorries, excavators, exoskeleton suit for heavy-duty tasks, motorcycles, trains, theme park rides; submarines, ships, boats, yachts, jet-skies for see vehicles; planes, gliders for air crafts, spaceships, shuttles for space crafts. Furthermore, the technology can be installed/integrated in a mobile platform such as a driver's/operator's head/eye protection apparatus such as a helmet or goggles. Therefore, any activity, which involves in wearing protective helmets/goggles, can benefit from this technology. These can be worn, but not limited to, by motorcyclist/cyclist, skiers, astronauts, exoskeleton operators, military personnel, miners, scuba divers, construction workers. Moreover, it can be used in a standalone environment for game consoles, arcade machines and with a combination of an external 2D/3D display it can be used as a simulation platform. Also, it can be used in institutions and museums for educational and entertainment purposes.

Figure 1:
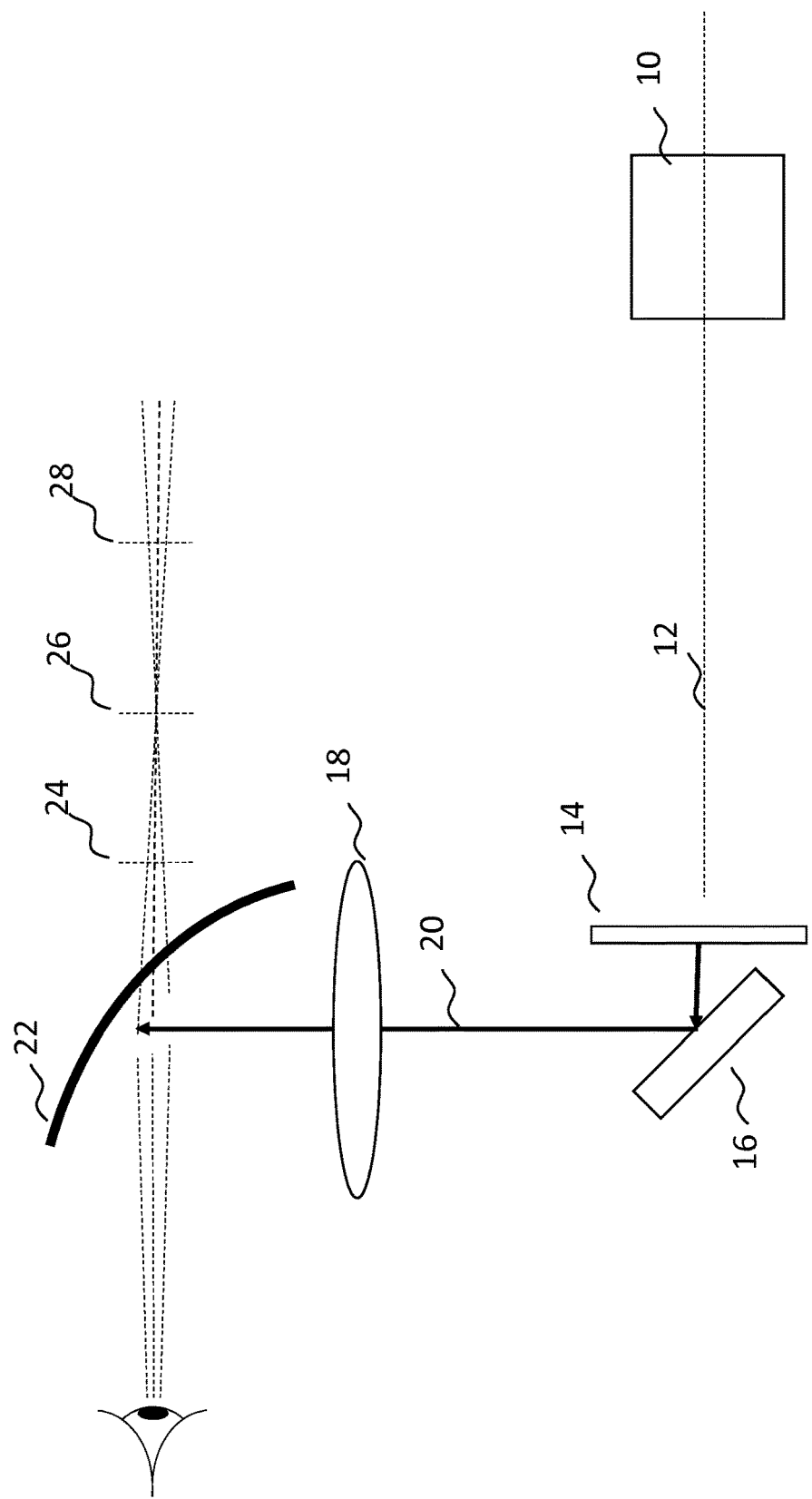
FIG. 1 is a schematic illustration of the apparatus according to an embodiment of the invention.

FIG. 1 is a schematic representation of the apparatus in an embodiment of the invention.

FIG. 1 is described with reference to the apparatus being installed in a motor vehicle 1. The skilled person would understand that the invention is applicable in other types of environments where a HUD is required and not just motor vehicles.

In FIG. 1 there is shown a schematic representation of the apparatus according to a first embodiment.

The apparatus of FIG. 1 is configured to project multi-depth images onto a head-up display.

In FIG. 1 there is shown a picture generation unit 10, said picture generation unit 10 having a first projection axis 12. The images generated by the picture generation unit are projected along the first projection axis 12 onto an image realisation device 14. The image realisation device 14 projects the images along axis 12 onto a spatial light modulator (SLM) 16, said SLM configured to generate lens pattern on the surface of the SLM 16, such that the SLM behaves as a digital lens. The image created as a result of the lens pattern is projected along axis 20 through optics 18 and onto the transparent screen of the head-up display 22 where, depending on the lens pattern generated is rendered as a virtual image 24, 26, 28 at given optical depth.

In FIG. 1 the picture generation unit 10 is configured to determine and create the source image to be rendered on the transparent screen 22. In an embodiment the picture generation unit 10 is formed of a laser and a 2D scanning mirror. In further embodiments the picture generation unit 10 comprises a holographic unit to produce computer generated holograms for forming on the diffuser. In an embodiment the picture generation unit comprises a light field unit. Such a light field unit is able to produce 3-dimensional light field images which formed on the image realisation device 14. In such an embodiment the picture generation unit is a LCD projector or LCoS projector or DMD projector.

The skilled person would appreciate that any suitable light source and imaging means may be used provided they were capable of forming one or more images on the image realisation device 14.

The image generated by the picture generation unit 10 is projected along the first projection axis 12 towards the image realisation device 14. As described with reference to FIGS. 2, 3, 4, 6 and 7 the image realisation device 14 may be implemented in a number of different manners.

The image realisation device 14 refers to a surface, or volume, within which an image is formed or rendered. As described in further detail below the image realisation device 14 in an embodiment is a diffusive surface or volume which renders the image projected from the picture generation unit 10. In a further embodiment, described with reference to FIG. 4, the picture generation unit 30 and image realisation device 14 form a self-luminous film display such as an OLED.

The image formed on the image realisation device 14 is projected towards the windscreen of the vehicle 1 via the spatial light modulator (SLM) 16. The SLM 16 and optics 18 define a projection optics 20. As described below the SLM 16 and optics 18 allows the focal length of the projection optics 20 to vary thus enabling the display of the information on the windscreen at multiple depths. In an embodiment the optics 18 are adjustable, or translatable around any axis in order to allow for manipulation of the optical path.

The SLM 16 comprises a light structuring device which is configured to simulate and write the focussing properties of a lens onto a surface. Such SLMs 16 are known and are commercially available. Preferably the SLM 16 is configured to write a Fresnel lens pattern onto a surface. Therefore, the focal length of the projection optics 20 can be controlled by varying the lens pattern written on the SLM 16. In one embodiment the SLM 16 varies the surface lens pattern (and therefore the focal length) over time and in further embodiments the SLM surface is partitioned. Each partition has a different focal length lens pattern thereby providing multiple focal lengths within a single co-planar element. Each partition, and therefore lens, may be configured separately thereby enabling the SLM 16 to define multiple, separately configurable, lenses on the same surface. In an embodiment each partition is same size. In an alternative embodiment, one or more partition has a different size to another partition. In a further embodiment, each partition is of a predefined unit size, where neighbouring partitions can be controlled as a group, thereby constituting a single, larger partition.

In further embodiments the transparent screen is replaced by a non-see-through screen such as those used in a virtual reality system.

The projection optics further comprises optics 18 which can be further configured to vary the focal length.

Figure 2:
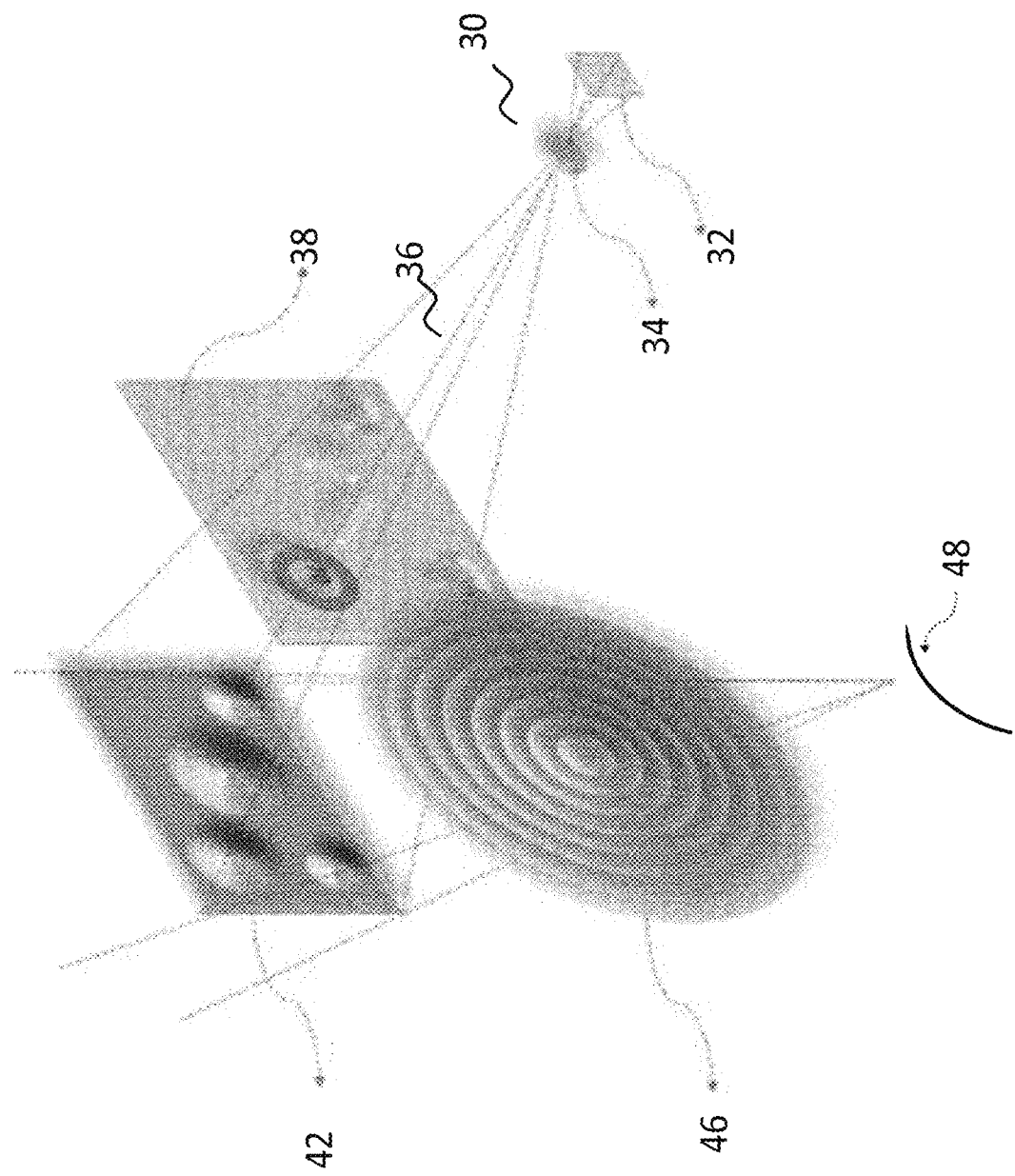
FIG. 2 is a schematic illustration of the apparatus according to an embodiment of the invention.

FIG. 2 is a schematic illustration of an apparatus for producing multi-depth, 3-D images according to an embodiment of the invention.

The apparatus shown in FIG. 2 utilises the same principles as the apparatus shown in FIG. 1. In particular, the apparatus shown in FIG. 2 is configured to provide multiple focal lengths for the projection optics through the use of an SLM.

In FIG. 2 there is shown a picture generation unit 30, said picture generation unit 30 comprising a first SLM 32 and first imagining optics 34. The picture generation unit 30 has a first projection axis 36. The images generated by the picture generation unit are projected along the first projection axis 36 onto a diffuser 38. The diffuser 38 projects the images along the projection axis onto a second spatial light modulator 42. The image created by the second SLM 42 is projected along the projection axis through optics 46 and onto the head-up display 48 where, depending on the lens pattern generated on the second SLM 42 is rendered as a virtual image at given optical depth.

As with the apparatus described with reference to FIG. 1, the apparatus of FIG. 2 allows for the total optical projection distance to be controlled in order to project images to their relevant locations in the perceived 3D scene.

In the present embodiment the picture generation unit 30 comprises a first SLM 32 and a set of first imaging optics 34. The second SLM surface 42 is partitioned into a plurality of regions each region having a different focal length lens pattern. As the focal length lens patterns of the second SLM surface are known the total focal length path, and therefore the optical depth, of each image will also be known. Accordingly, by projecting the image, or parts of the image, at the desired portion of the second SLM 42, it is possible to select the optical depth at which the image is rendered on the transparent screen of the HUD 48. Thus it is possible to project the image at various depths by selectively projecting the image at a particular part of the second SLM 42. In this way, the total optical projection distance can be controlled in order to project images to their relevant locations in the perceived 3D scene.

In such embodiments the first SLM 32 and first imagining optics 34 are configured to project the relevant image, or part of the image, onto the desired portion of the second SLM 42. A processor (not shown) controls the generation of the images to be displayed. As part of the generation of the image the desired projected depth is determined. The generation of the image and the depth may be determined in a known manner. As the depth of the image is dependent on the projection of the image onto the relevant region of the second SLM 42 the processor ensures that the first SLM 32 and first imaging optics 34 project the image onto the desired portion of the second SLM 42 so as to project the image at the desired depth on the windscreen.

Figure 3:
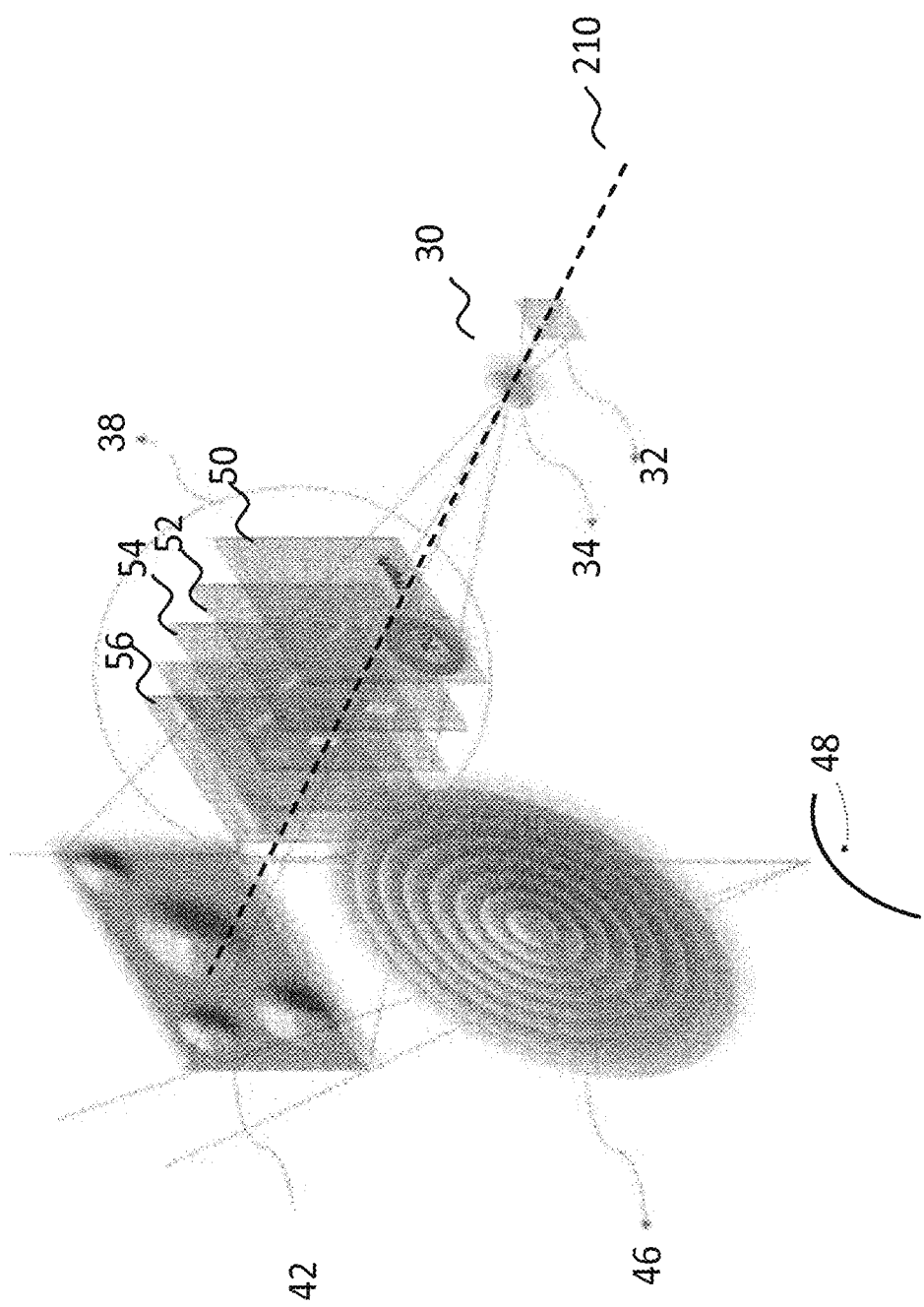
FIG. 3 is a schematic illustration of the apparatus according to an embodiment of the invention.

FIG. 3 is a schematic illustration of an apparatus for producing multi-depth, 3-D images, according to an embodiment of the invention.

There is shown the apparatus of FIG. 2 wherein the single diffuser of FIG. 2 is replaced with multiple stacked diffusers 50, 52, 54, 56. For ease of understanding four diffusers are shown, though in further embodiments any number of diffusers greater than two may be used.

The multiple stacked diffusers 50, 52, 54, 56 in FIG. 3 therefore define three image realisation surfaces. The image realisation surfaces are planar and are distributed along the projection axis 210, and preferably each image realisation surface 50, 52, 54, 56 is centred on the projection axis 210, with its normal parallel to the projection axis 210.

Each image realisation surface of the multiple stacked diffusers 50, 52, 54, 56 at least partially overlaps in the projection axis. That is to say the image projected along the projection axis will pass through at least two diffusers.

In an embodiment, each of the image realisation surfaces 50, 52, 54, 56 is controllably switchable between a first transparent state and a second optically diffusive state. In further embodiments each image realisation surface comprises a plurality of regions (or cells) wherein each region of each cell is individually controllably switchable between a first transparent state and a second optically diffusive state. Such diffusers are known in the art. In an embodiment the diffuser is a SmA liquid crystal device.

In operation, the picture generation unit 30 projects a series of real images towards the image realisation surfaces 50, 52, 54, 56. As the image realisation surfaces are spatially separate and overlap it is therefore possible to selectively choose, by rendering the surfaces transparent or optically diffusive, which of the three image realisation surfaces on which to render the image.

Accordingly, it is possible to increase, or decrease, the optical path length between the images rendered on the multi-stacked diffuser and the transparent screen. As such the configuration shown in FIG. 3 allows for a further means on controlling the depth of the displayed image on the transparent screen.

Figure 4:
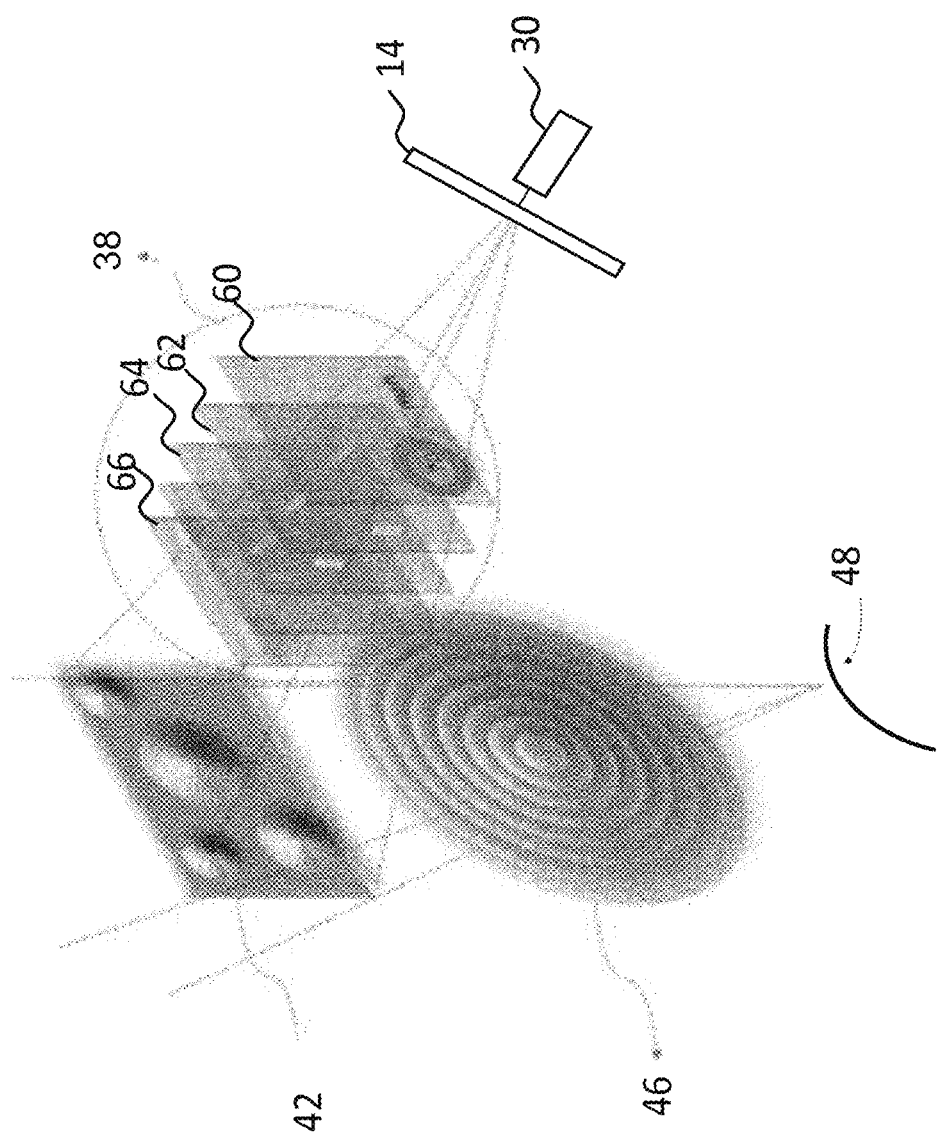
FIG. 4 is a schematic illustration of the apparatus according to an embodiment of the invention.

FIG. 4 is a schematic illustration of an apparatus for producing multi-depth, 3-D images according to an embodiment of the invention.

There is shown the apparatus of FIG. 3 wherein each of the image realisation surfaces 50, 52, 54, 56 is an image generation layer 60, 62, 64, 66.

In an embodiment, the image generation layer 60, 62, 64, 66 is an electroluminescent device such as an OLED, though in further embodiments any suitable image generation means may be employed.

As with the optical diffuser embodiment, each of the image realisation surfaces 60, 62, 64, 66 is controllably switchable between a first transparent state and a second image generation state. Preferably each surface comprises a number of different regions, or cells. As such the configuration described in FIG. 4 functions in the same manner as the configuration shown in FIG. 3.

In use, each image realisation surface 60, 62, 64, 66 generates a real image to be projected onto the transparent screen. The non-image generating regions of each image realisation surface 60, 62, 64, 66 are in a transparent state, thereby enabling any images preceding them on the optical path to be transmitted through to the projection optics.

As each real image is generated on one of the spaced image realisation surface 60, 62, 64, 66 they are at a different distance from the focal point of the projection optics with each real image projected onto the screen 22 appearing as a virtual image having a distinct level of focus (or perceived depth) 24, 26, 28.

In FIGS. 2, 3 and 4 the second SLM 42 shown is a reflective, or transflective SLM. As described with reference to FIGS. 6 and 7 the SLM 42 may be a transmissive SLM.

Advantageously the configuration described allows for the greater controller of the optical depth of the image projected onto the transparent screen and therefore allow objects to be placed at different perceived depths on the windscreen.

Figure 5:
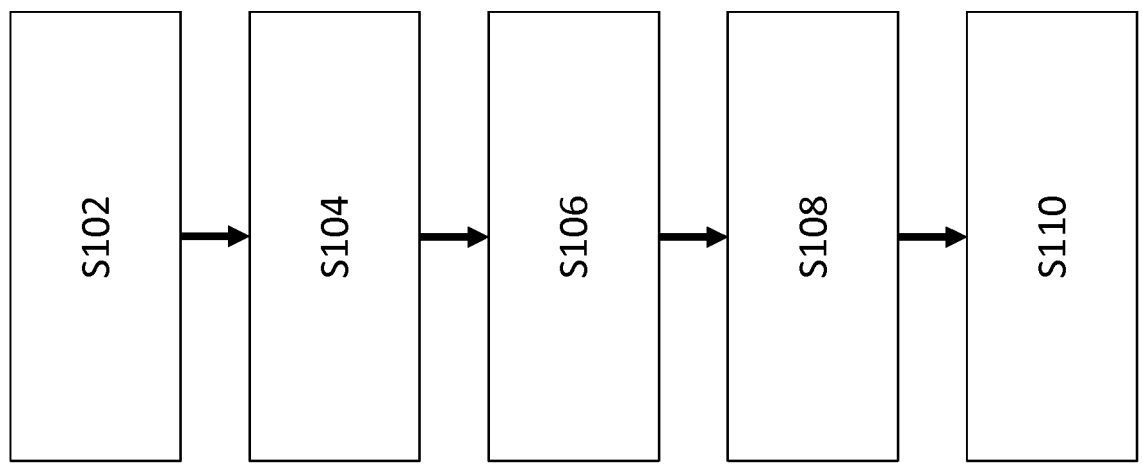
FIG. 5 is a flow chart of the process for generating the image to be rendered on the head-up display.

FIG. 5 is a flow chart of the process for generating the image to be rendered on the head-up display.

In an embodiment of the invention the apparatus generates a virtual image which is displayed on the transparent screen, the transparent screen being a windscreen of the vehicle 1. As is known the windscreen of a vehicle 1 is a geometrically distorted shape i.e. it is not flat. Accordingly, an image that is projected onto the windscreen will be distorted, the level of distortion being affected by various factors such as the shape of the windscreen, and the average distance of the windscreen from the projected image.

The apparatus described herein is able to generate an image which can be presented at various depths. Whilst the generation of the images at multiple depths on the transparent screen provides many advantages over a flat, single depth, image the ability to correct for factors such as the curvature of the windscreen results in further improvements in terms of depth control and image manipulation.

Advantageously in order to reduce the effect of the distortion in an aspect of the invention the windscreen distortion is corrected for by the image generation unit using software to pre-distort the image such that the image rendered on the windscreen is free from any distortions created by the windscreen. Such a software based correction eliminates the need for bulky correction optics and furthermore provides a higher degree of flexibility which can adapt to different windscreens.

In an alternative embodiment, the size, configuration and focal length of the multiple lenses generated on the surface of the light structuring device are controlled in order to correct for the distortions resulting from the optics and/or the irregular nature of the projection surface. Accordingly, the light structuring device can provide both distortion correction and depth control by modulating the focal length of discreet regions on its surface. As each lens is separately, and individually, configurable such correction may be applied to each lens separately. In embodiments such as HUDs in a vehicle 1, the distance to the image realisation surface, (such as the windscreen) is constant and the distortion caused by the imaging surface would remain constant over time. Therefore the necessary distortion correction factor can be calculated and applied to the lens. In an embodiment the correction of the image is applied before the image is projected onto the surface (i.e. it is applied pre-distortion), such that the distortion corrected image is displayed.

In this manner, the diffractive optical setup described above allows for more than one lens function to be applied onto a single layer of an amplitude and/or phase modulating surface. As such, a focussing function and distortion correction function can be achieved with a single SLM 16.

Accordingly, using the function $l(x)$ to represent the depth control, and the function $d(x)$ to represent the correction of the distortion induced by optics or windscreen using a pre-distortion pattern, the overall focussing function can be given by $p(x)=l(x).d(x)$ which can be applied using the described SLM 16. As such, there is no need for bulky free-form mirrors which are conventionally used to compensate for distortion.

The images to be presented on the transparent screen are generated by a picture generation unit. The picture generation unit defining the image to be displayed by the transparent screen. By way of example the image may comprise information regarding the car conditions and further information relating to navigation.

The term picture generation unit refers to the apparatus which determines and generates the base image to be rendered on the transparent screen. The process described herein is applicable to any suitable form of picture generation apparatus.

The picture generation unit comprises an image source which generates the image to be displayed on the transparent screen. The image source in an embodiment is a light engine, or OLED display or any suitable source which generates the image to be displayed. The image source comprises a software driver configured to determine and generate the image on the image source.

The software driver comprises a component which determines the content to be displayed. The process of the generation of content is known and in an aspect is performed using known means.

The driver further comprises a distortion module, the distortion module configured to apply a distortion to the generated image, the distortion calculated such that when the image is displayed on the transparent screen/windscreen the image appears undistorted to the end user.

At step S102 the windscreen is modelled as a mirrored surface. At step S102 the shape and gradient of the windscreen is determined. In an embodiment, as the shape of the windscreen is typically constant for a particular make and model of a vehicle 1 it is pre-programmed.

At step S104 the image to be displayed on the transparent screen is taken as reference input image. Such an image will typically change several times per second.

At step S106 the input image is separated for each colour channel of the image to create an image per colour channel.

At step S108 for each colour channel image, for each pixel of the image the position of the pixel as visualised by a viewer located at a distance away from the windscreen surface is determined. This is determined by using ray reflection in order to determine the position of the pixel based on the average distance of the input pixel (as per step S106) the reflection surface of the windscreen (as per step S102) and the average distance between the rendered image and the windscreen, the image depth.

Therefore, at step S108 the level of distortion for each colour channel image, as a result of the windscreen and the physical distances, is calculated. This results in a distorted image (with the level of distortion being dependent on the physical parameters) for each colour channel. This can be done by monitoring the displacements of certain pre-defined points on a distorted image and fitting them to obtain the related distortion parameters.

At step S110 the individual distorted colour channel images are combined. The combined image is the resultant pre-distortion image as the projection of the pre-distortion image will result in the input image (as per step S104) being displayed.

As such the process provides an improved methodology for ensuring that the displayed virtual image is free from distortion.

In further embodiments the digital lens is used to compensate for the distortion of the windshield. In such embodiments, the phase change introduced by the windshield, when the light travels the distance between the digital lens and the windshield, is measured, or calculated from known software models of the windshield and compensated for. In such embodiments the phase data can be superposed with the lens profiles which are generated for the digital lens patterns (as described with reference to FIGS. 1, 2, 3 and 4). By including such phase data, it functions to add a digital representation of the free form optical components. The formed images on the diffuser 38 or diffusers 50, 52, 54, 56 are therefore displayed as undistorted images. As the undistorted images are relayed through the digital lens 42, they will undergo some level of distortion. This distortion is subsequently corrected by the distortion caused by the windshield. Therefore, the displayed virtual image will be seen as a totally undistorted image.

Figure 6:
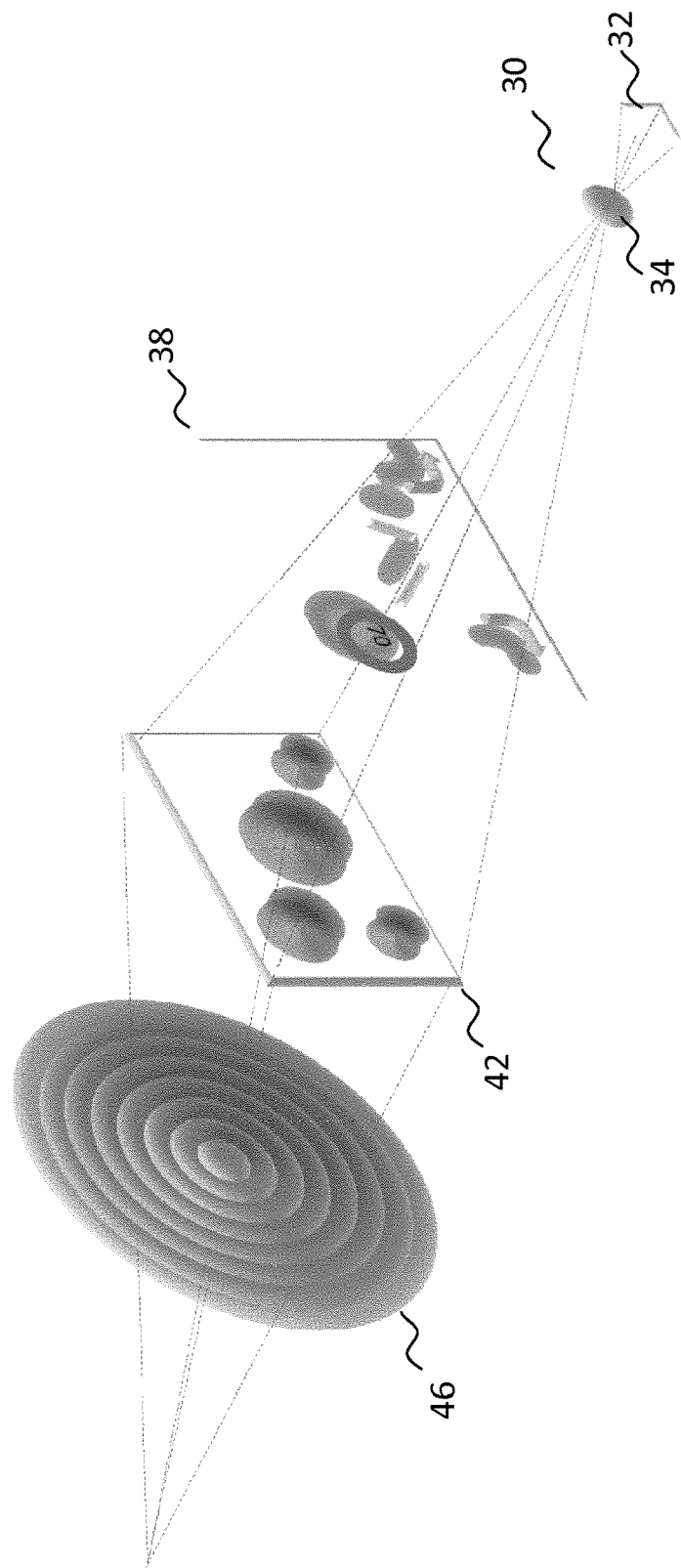
FIG. 6 is a schematic illustration of the apparatus according to an embodiment of the invention.

FIG. 6 is a further apparatus for producing multi-depth, 3-D images according to an embodiment of the invention.

The apparatus shown in FIG. 6 utilises the same principles as the apparatus shown in FIGS. 2, 3 and 4 where the reference numerals refer to the same features as defined in FIGS. 2, 3 and 4.

In the apparatus in FIG. 6 the picture generating unit 30, comprising the first SLM 32 and first imagining optics 34 projects the image to the diffuser 38. As described above, depending on the lens pattern generated on the second SLM 42, wherein each lens pattern may be independently configurable, the image is rendered, preferably via optics 46, onto the display (not shown) at a given optical depth.

In FIG. 6 the second SLM 42, is a transmissive SLM. In the embodiments shown with respect to FIGS. 2, 3 and 4 a different type of SLM (for example a reflective SLM) is used. By changing the type of the SLM 42 greater flexibility in the optical arrangement is possible.

Figure 7:
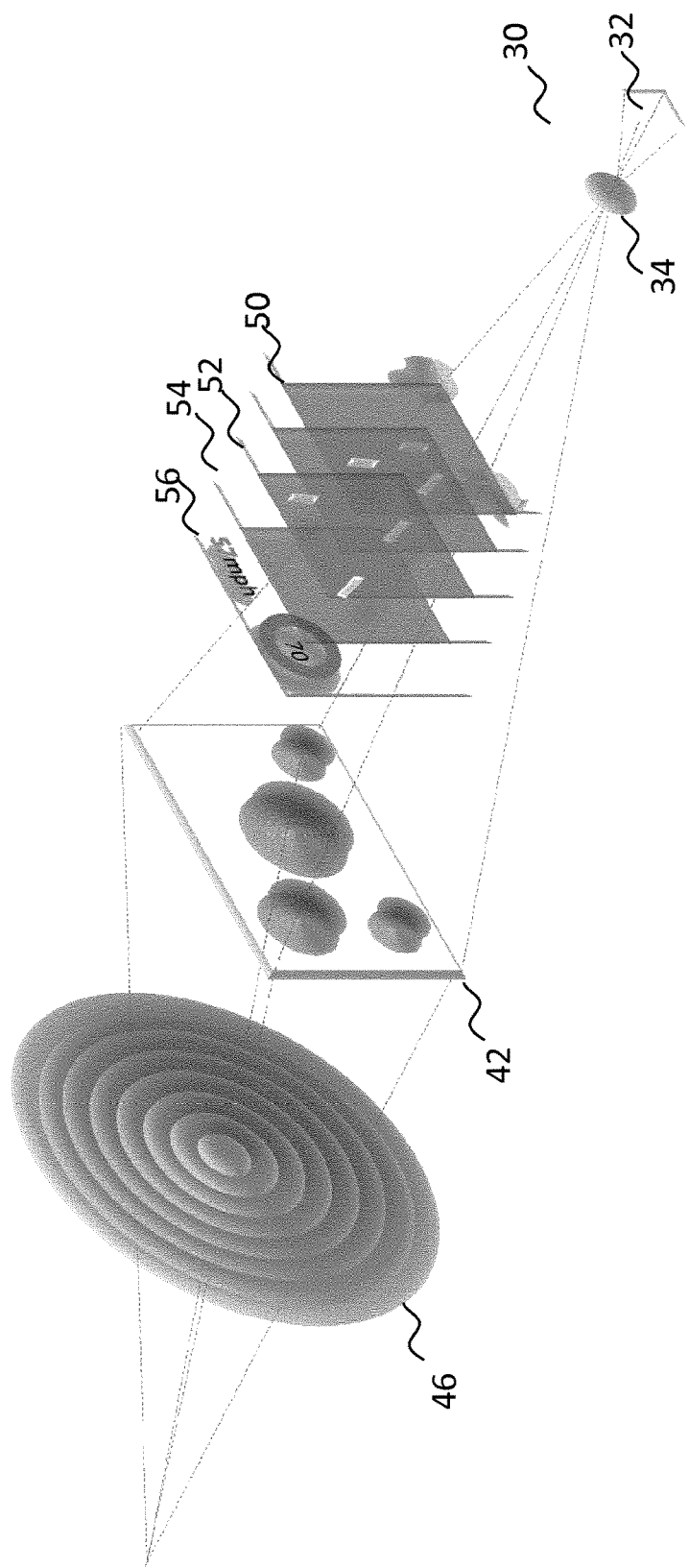
FIG. 7 is a schematic illustration of the apparatus according to an embodiment of the invention.

FIG. 7 is a further apparatus for producing multi-depth, 3-D images according to an embodiment of the invention.

The embodiment shown in FIG. 7 is largely similar to the multiple stacked diffuser embodiment described with reference to the FIG. 3. However in FIG. 7 the second SLM 42 is a transmissive SLM therefore allowing for a different configuration of the apparatus. In particular, as with FIG. 6, the use of the transmissive SLM allows for the different configurations of the apparatus to be used.

Figure 8:
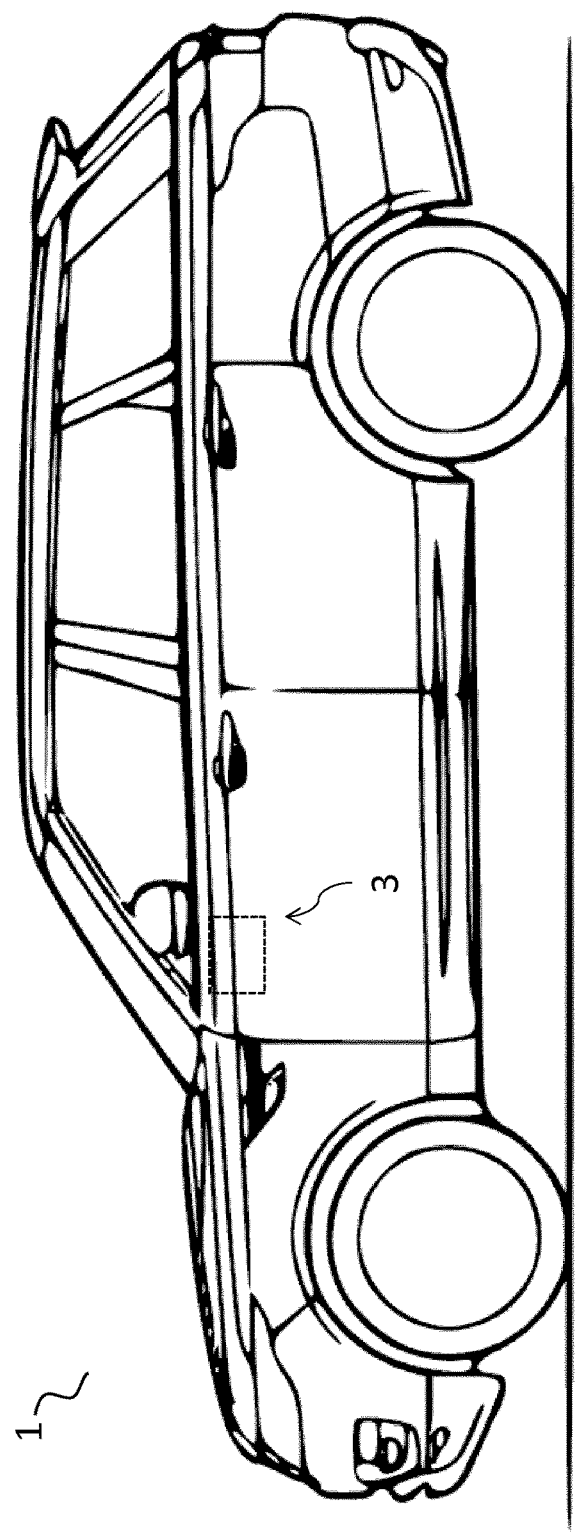
FIG. 8 is a vehicle according to an embodiment of the invention.

FIG. 8 illustrates a vehicle 1 comprising the apparatus 3 of FIGS. 1 to 4 and 6, 7. The apparatus 3 may be embodied in an imaging system.

The invention claimed is:

1. An imaging system for generating multi-depth virtual images on a display screen, the imaging system comprising:
   an image realisation device for forming a source image; and
   projection optics for rendering a display image on the display screen, wherein the display image is a virtual image corresponding to the source image,
   wherein the image realisation device comprises:
      an image realisation surface and a light structuring device having a surface with a first and second region, wherein the light structuring device is configured to simulate a first lens having a first focal length on the first region of the surface, wherein the surface and the image realisation surface are arranged such that a first source image formed on a first region of the image realisation surface and projected through the projection optics will render a first display image on the display screen at a first apparent depth,
      wherein the light structuring device is further configured to simulate a second, different lens on the second region of the surface, said second lens having a second focal length, and wherein the surface and image realisation surface are arranged such that a second source image formed on a second region of the image realisation surface and projected through the projection optics will render a second display image on the display screen at a second apparent depth, and
      wherein the light structuring device is further configured to simulate the first and second lens on the surface of the light structuring device at different regions on the surface and to display the first and second lenses at the same time to allow multi-depth images to be displayed at the same time.

2. The imaging system according to claim 1, wherein the light structuring device is a spatial light modulation device.

3. The imaging system according to claim 1, wherein the display screen is the screen of a head-up display.

4. The imaging system according to claim 1, wherein one or both of the size and focal length of the first and second lens are independently configurable.

5. The imaging system according to claim 1, wherein the image realisation surface comprises a first surface, said first surface being a diffusive surface configured to form an image.

6. The imaging system according to claim 5, wherein the image realisation surface further comprises a second diffuser, said first and second diffusers at least partially overlapping.

7. The imaging system according to claim 6, wherein at least part of each diffuser is configured to selectively switch between a first transparent state and a second optically diffusive state.

8. The imaging system according to claim 1, wherein the image realisation surface is an electroluminescent device.

9. The imaging system according to claim 8, wherein the system comprises a second electroluminescent device.

10. The imaging system according to claim 9, wherein at least part of each electroluminescent device is actively switchable between a transparent and image generating state.

11. The imaging system according to claim 1, further comprising a picture generation unit for generating the source image to be rendered as the display image on the display screen and projecting the source image onto the image realisation surface.

12. The imaging system according to claim 11, wherein the image realisation device for forming the source image, and picture generation unit are arranged along an optical axis of the picture generating unit.

13. The imaging system according to claim 11, wherein the picture generation unit comprises a laser and a 2D scanning mirror for forming the images on the diffuser.

14. The imaging system according to claim 11, wherein the picture generation unit comprises a holographic unit to produce computer generated holograms for forming on the diffuser.

15. The imaging system according to claim 11, wherein the picture generation unit comprises a light field unit configured to produce 3-dimensional light field images for forming on the image realisation surface.

16. The imaging system according to claim 11, wherein the picture generation unit is configured to selectively direct at least part of the picture onto the first or second lens on the spatial light modulation device.

17. The imaging system according to claim 11, wherein the picture generation unit is configured to generate an input image to be rendered on the display screen as the display image, wherein the input image is adjusted to compensate for any distortion due to the display screen.

18. The imaging system according to claim 17, wherein the input image is further adjusted to compensate for any distortion due to the light structuring device.

19. A vehicle comprising the imaging system of claim 1.

20. A method for generating multi-depth virtual images on a display screen, the method comprising:
   forming a source image with an image realisation device; and
   rendering a display image on the display screen, via a projection optics wherein the display image is a virtual image corresponding to the source image,
   wherein the image realisation device comprises:
      an image realisation surface and a light structuring device having a surface with a first and second region, wherein the light structuring device is configured to simulate a first lens having a first focal length on the first region of the surface, wherein the surface and image realisation surface are arranged such that a first source image formed on a first region of the image realisation surface and projected through the projection optics will render a first display image on the display screen at a first apparent depth,
      wherein the light structuring device is further configured to simulate a second, different, lens on the second region of the surface, said second lens having a second focal length, and wherein the surface and image realisation surface are arranged such that a second source image formed on a second region of the image realisation surface and projected through the projection optics will render a second display image on the display screen at a second apparent depth, and
      wherein the light structuring device is further configured to simulate the first and second lens on the surface of the light structuring device at different regions on the surface and to display the first and second lenses at the same time to allow multi-depth images to be displayed at the same time.

\* \* \* \* \*